United States Patent
Kusano et al.

(10) Patent No.: US 11,273,435 B2
(45) Date of Patent: Mar. 15, 2022

(54) PRODUCTION METHOD FOR FLUORINATED CATION EXCHANGE MEMBRANE

(71) Applicant: AGC Inc., Chiyoda-ku (JP)

(72) Inventors: Hiromitsu Kusano, Chiyoda-ku (JP); Takayuki Kaneko, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 114 days.

(21) Appl. No.: 15/173,916

(22) Filed: Jun. 6, 2016

(65) Prior Publication Data

US 2016/0279627 A1 Sep. 29, 2016

Related U.S. Application Data

(63) Continuation of application No. PCT/JP2014/083776, filed on Dec. 19, 2014.

(30) Foreign Application Priority Data

Dec. 25, 2013 (JP) .............................. JP2013-267208

(51) Int. Cl.
*B01J 39/20* (2006.01)
*C25B 13/08* (2006.01)
(Continued)

(52) U.S. Cl.
CPC ............... *B01J 39/20* (2013.01); *B01J 47/12* (2013.01); *C25B 13/02* (2013.01); *C25B 13/04* (2013.01); *C25B 13/08* (2013.01)

(58) Field of Classification Search
CPC ......... C25B 13/08; C25B 13/02; C25B 13/00; C25B 9/08; C25B 9/06; C25B 1/46; B01J 39/00; B01J 39/20
See application file for complete search history.

(56) References Cited

U.S. PATENT DOCUMENTS

2006/0287497 A1* 12/2006 Tayanagi ............ H01M 8/1039
528/391

FOREIGN PATENT DOCUMENTS

JP 59-35689 2/1984
JP 59-219487 12/1984
(Continued)

OTHER PUBLICATIONS

Document #1: https://chem.libretexts.org/Bookshelves/Organic_Chemistry/Supplemental_Modules_(Organic_Chemistry)/Fundamentals/Intermolecular_Forces/Polar_Protic_and_Aprotic_Solvents (Year: NA).*

(Continued)

*Primary Examiner* — Tabassom Tadayyon Eslami
(74) *Attorney, Agent, or Firm* — Oblon, McClelland, Maier & Neustadt, L.L.P.

(57) ABSTRACT

To provide a method for producing a fluorinated cation exchange membrane, by which a fluorinated cation exchange membrane having a high effect to suppress attachment of the gas to the surface on the cathode side and having an excellent resistance to dropping of inorganic particles from a gas-releasing layer provided on the cathode side can be obtained.
A method for producing a fluorinated cation exchange membrane 1 for electrolysis comprising, on at least the cathode side, a layer ($\alpha1$) 12 containing a perfluorocarbon polymer (A) having carboxylic acid groups or precursor groups of carboxylic acid groups, and a gas-releasing layer ($\alpha2$) 10 provided on the cathode side of the layer ($\alpha1$) 12, which comprises applying to the surface of the layer ($\alpha1$) 12 a coating liquid containing inorganic particles having an average secondary particle size of from 0.5 to 1.5 μm, a binder and a dispersion medium in a mass ratio of the binder (Continued)

to the total mass of the inorganic particles and the binder of from 0.15 to 0.3, to form the gas-releasing layer ($\alpha$2) 10.

19 Claims, 2 Drawing Sheets

(51) Int. Cl.
*B01J 47/12* (2017.01)
*C25B 13/04* (2021.01)
*C25B 13/02* (2006.01)

(56) References Cited

FOREIGN PATENT DOCUMENTS

| JP | 64-55393 | | 3/1989 |
|----|----|----|----|
| JP | 3-137136 | * | 3/1991 |
| JP | 3-137136 | | 6/1991 |
| JP | 05-009771 | * | 1/1993 |
| JP | 2006152065 A | * | 6/2006 |
| JP | 2013-163857 | | 8/2013 |
| JP | 2013-163858 | * | 8/2013 |

OTHER PUBLICATIONS

International Search Report dated Mar. 31, 2015 in PCT/JP2014/083776 filed on Dec. 19, 2014.

* cited by examiner

PRODUCTION METHOD FOR FLUORINATED CATION EXCHANGE MEMBRANE

TECHNICAL FIELD

The present invention relates to a method for producing a fluorinated cation exchange membrane.

BACKGROUND ART

In alkali metal chloride electrolysis of electrolyzing an aqueous alkali metal chloride (such as sodium chloride, potassium chloride or lithium chloride) solution to produce an alkali metal hydroxide and chlorine, an ion exchange membrane method of using a fluorinated cation exchange membrane as a diaphragm has been widely used. As the fluorinated cation exchange membrane, a fluorinated cation exchange membrane having at least two layers of a layer made of a fluorinated polymer having sulfonic acid groups (—$SO_3H$) on the anode side and a layer made of a fluorinated polymer having carboxylic acid groups (—COOH) on the cathode side is suitably used.

In alkali metal chloride electrolysis using a fluorinated cation exchange membrane, if a gas (such as hydrogen gas) formed by electrolysis is attached to the surface particularly on the cathode side of the fluorinated cation exchange membrane, the gas acts as a shield to increase the electrical resistance, whereby the electrolysis voltage will increase and the energy loss tends to be significant. Accordingly, it has been proposed to provide a gas-releasing layer (hydrophilizing layer) comprising inorganic particles (e.g. zirconium oxide) and a binder (e.g. a fluorinated polymer) on the surface on the cathode side of the fluorinated cation exchange membrane thereby to suppress adhesion of the gas. The inorganic particles make irregularities on the membrane surface thereby to hydrophilize the surface, and thus adhesion of the gas is suppressed.

As a method for producing such a fluorinated cation exchange membrane, for example, the following methods have been known.

(i) A method of applying a coating liquid having inorganic particles having an average primary particle size of from 0.01 to 0.08 μm and a fluorinated polymer solution mixed and dispersed, to the surface on the cathode side of a membrane having a layer made of a fluorinated polymer having precursor groups of exchange groups (sulfonic acid groups or carboxylic acid groups) and having a reinforced woven fabric embedded therein, e.g. by airless spray to form a gas-releasing layer, and hydrolyzing and converting the precursor groups into ion exchange groups (Patent Document 1).

(ii) A method of hydrolyzing, of a membrane having a layer made of a fluorinated polymer having precursor groups of ion exchange groups (sulfonic acid groups or carboxylic acid groups), the precursor groups and converting them into ion exchange groups, and applying a dispersion containing zirconium oxide having an average primary particle size of from 5 to 9 μm and a fluorinated polymer to the surface on the cathode side of the membrane to form a gas-releasing layer (Patent Document 2).

PRIOR ART DOCUMENTS

Patent Documents

Patent Document 1: JP-A-3-137136
Patent Document 2: JP-A-59-219487

DISCLOSURE OF INVENTION

Technical Problem

However, by the methods (i) and (ii), when the surface of the fluorinated cation exchange membrane is brought into contact with another member or the like and rubbed, the inorganic particles may drop off from the gas-releasing layer formed on the cathode side. Further, if the proportion of the binder is increased to prevent dropping of the inorganic particles, the irregularities on the surface of the gas-releasing layer are reduced, and the effect to suppress attachment of the gas will be lowered. Accordingly, it is difficult to satisfy both the effect to suppress attachment of the gas to the surface on the cathode side of the fluorinated cation exchange membrane and resistance to dropping of the inorganic particles from the gas-releasing layer.

The object of the present invention is to provide a method for producing a fluorinated cation exchange membrane, by which a fluorinated cation exchange membrane having a high effect to suppress attachment of the gas to the surface on the cathode side and having an excellent resistance to dropping of inorganic particles from the gas-releasing layer provided on the cathode side, can be obtained.

Solution to Problem

The present invention provides a method for producing a fluorinated cation exchange membrane having the following constitutions [1] to [5].

[1] A method for producing a fluorinated cation exchange membrane for electrolysis comprising, on at least the cathode side, a layer (α1)) containing a perfluorocarbon polymer (A) having carboxylic acid groups or precursor groups of carboxylic acid groups, and a gas-releasing layer (α2) provided on the cathode side of the layer (α1), which comprises applying to the surface of the layer (α1)) a coating liquid containing inorganic particles having an average secondary particle size of from 0.5 to 1.5 μm, a binder and a dispersion medium in a mass ratio of the binder to the total mass of the inorganic particles and the binder of from 0.15 to 0.3, to form the gas-releasing layer (α2).

[2] The method according to the above [1], wherein the inorganic particles are particles of at least one member selected from the group consisting of an oxide, nitride and carbide of a Group 4 element or Group 14 element.

[3] The method according to the above [1] or [2], wherein the inorganic particles are particles of $SiO_2$, SiC, $ZrO_2$ or ZrC.

[4] The method according to any one of the above [1] to [3], wherein the average primary particle size of the inorganic particles is from 0.02 to 0.4 μm.

[5] The method according to any one of the above [1] to [4], wherein the binder is a fluorinated polymer (C) having carboxylic acid groups or sulfonic acid groups.

[6] The method according to any one of the above [1] to [5], wherein the perfluorocarbon polymer (A) is a copolymer having structural units derived from the following monomer (1) and structural units derived from the following monomer (2):

(in the formula (1), each of $X^1$ and $X^2$ which are independent of each other, is a fluorine atom, a chlorine tom or a trifluoromethyl group, and in the formula (2), $X^3$ is a fluorine atom or a trifluoromethyl group, m is an integer of from 1 to 5, n is 0 or 1, and Y is a precursor group capable of being converted into a carboxylic acid group by hydrolysis).

[7] The method according to any one of the above [1] to [6], wherein the ion exchange capacity of the layer ($\alpha 1$)) containing the perfluorocarbon polymer (A) is from 0.7 to 1.1 meq/g dry resin.

[8] The method according to any one of the above [1] to [7], wherein a layer ($\beta 1$) containing a perfluorocarbon polymer (B) having sulfonic acid groups or precursor groups of sulfonic acid groups, is provided on the anode side.

[9] The method according to the above [8], wherein a gas-releasing layer ($\beta 2$) is provided on the outer side of the layer ($\beta 1$).

[10] The method according to the above [8] or [9], wherein the perfluorocarbon polymer (B) is a copolymer having structural units derived from the following monomer (1) and structural units derived from the following monomer (3):

$$CF_2=CX^1X^2 \quad (1)$$

$$CF_2=CF(OCF_2CFX^4)_sO(CF_2)_tW \quad (3)$$

(in the formula (1), each of $X^1$ and $X^2$ which are independent of each other, is a fluorine atom, a chlorine torn or a trifluoromethyl group, and in the formula (3), $X^4$ is a fluorine atom or a trifluoromethyl group, s is an integer of from 1 to 3, t is 0, 1 or 2, and W is a precursor group capable of being converted into a sulfonic acid group by hydrolysis).

[11] The method according to any one of the above [8] to [10], wherein the ion exchange capacity of the layer ($\beta 1$) containing the perfluorocarbon polymer (B) is from 0.9 to 1.15 meq/g dry resin.

[12] The method according to any one of the above [9] to [11], which comprises the following steps (a) to (c):

[step (a)]: laminating the gas-releasing layer ($\beta 2$), the layer ($\beta 1$) and the layer ($\alpha 1$)) in this order to obtain a composite membrane;

[step (b)]: in a case where the composite membrane has precursor groups of carboxylic acid groups and/or precursor groups of sulfonic acid groups, hydrolyzing and converting the precursor groups of carboxylic acid groups and/or the precursor groups of sulfonic acid groups into carboxylic acid groups and/or sulfonic acid groups; and

[step (c)] applying a coating liquid containing inorganic particles (P), a binder and a dispersion medium in a binder ratio of from 0.15 to 0.3 to the surface of the layer ($\alpha 1$)) in the composite membrane and removing the dispersion medium by heating to form the gas-releasing layer ($\alpha 2$).

Advantageous Effects of Invention

According to the method for producing a fluorinated cation exchange membrane of the present invention, it is possible to obtain a fluorinated cation exchange membrane having a high effect to suppress attachment of the gas to the surface on the cathode side and having an excellent resistance to dropping of inorganic particles from the gas-releasing layer provided on the cathode side.

DESCRIPTION OF EMBODIMENTS

The following definitions of terms are applicable throughout description and claims.

"Primary particles" mean minimum particles observed by a scanning electron microscope (SEM). Further, "secondary particles" mean particles having primary particles agglomerated.

"A ball mill" means a type of mill in which the particle size of the medium (beads) used is from 10 to 50 mm.

"A bead mill" means a type of mill in which the particle size of the medium (beads) used is from 0.03 to 2 mm.

"A fluorinated polymer" means a polymer compound having fluorine atoms in its molecule.

"A perfluorocarbon polymer" means a polymer having all the hydrogen atoms bonded to carbon atoms in the polymer are substituted with fluorine atoms. Some of fluorine atoms in the perfluorocarbon polymer may be substituted with chlorine atoms or bromine atoms.

"A monomer" represents a compound having a polymerizable double bond.

"Structural units" generically mean units derived from a monomer directly formed by polymerization of the monomer and units obtained by chemical conversion of part of the units derived from a monomer formed by polymerization of the monomer.

"A precursor group" means a group capable of being converted into an ion exchange group (a carboxylic acid group or a sulfonic acid group) by a known treatment such as hydrolysis or conversion into an acid form.

In this specification, a monomer represented by the formula (1) will be referred to as a monomer (1), and the same applies to monomers represented by other formulae.

<Fluorinated Cation Exchange Membrane>

The fluorinated cation exchange membrane produced by the production method of the present invention is a fluorinated cation exchange membrane for alkali metal chloride electrolysis, comprising, on at least the cathode side, a layer ($\alpha 1$) containing a perfluorocarbon polymer (A) (hereinafter sometimes referred to as a polymer (A)) having carboxylic acid groups or precursor groups of carboxylic acid groups, and a gas-releasing layer ($\alpha 2$) provided on the outer side of the layer ($\alpha 1$). Hereinafter the present invention will be described with reference to an example of a fluorinated cation exchange membrane produced by the production method of the present invention.

Figure 1:
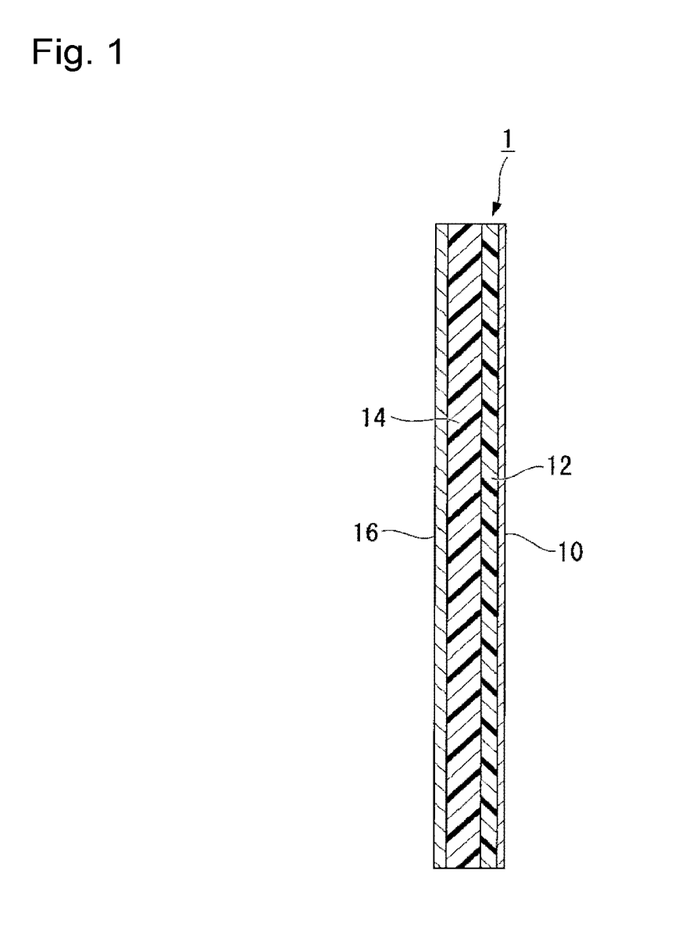
FIG. 1 is a cross-sectional view schematically illustrating an example of a fluorinated cation exchange membrane produced by the production method of the present invention.

A fluorinated cation exchange membrane 1 according to this embodiment comprises, as shown in FIG. 1, a gas-releasing layer ($\alpha 2$) 10, a layer ($\alpha 1$) 12 containing the polymer (A), a layer ($\beta 1$) 14 containing a perfluorocarbon polymer (B) (hereinafter sometimes referred to as a polymer (B)) having sulfonic acid groups or precursor groups of sulfonic acid groups, and a gas-releasing layer ($\beta 2$) 16 laminated in this order.

The fluorinated cation exchange membrane 1 is disposed in an electrolytic cell so that the gas-releasing layer ($\alpha 2$) faces the cathode and the gas-releasing layer ($\beta 2$) faces the anode.

The shape and the size of the fluorinated cation exchange membrane 1 are properly determined depending upon the electrolytic cell to which the fluorinated cation exchange membrane 1 is applied.

[Layer ($\alpha 1$)]

The layer ($\alpha 1$) 12 is a layer containing the polymer (A). The layer ($\alpha 1$) 12 may be a layer having a reinforcing material embedded so long as it is a layer containing the polymer (A), and it may be a monolayer or a multilayer, however, in view of the electrolysis performance, it is preferably a layer made of the polymer (A) containing no substance other than the polymer (A), such as a reinforcing material.

The polymer (A) is preferably a copolymer having structural units derived from the following monomer (1) and structural units derived from the following monomer (2), or a polymer obtained by hydrolyzing the copolymer to convert Y into —COOH:

$$CF_2=CX^1X^2 \qquad (1)$$

$$CF_2=CF(OCF_2CFX^3)_nO(CF_2)_mY \qquad (2)$$

(in the formula (1), each of $X^1$ and $X^2$ which are independent of each other, is a fluorine atom, a chlorine atom or a trifluoromethyl group, and in the formula (2), $X^3$ is a fluorine atom or a trifluoromethyl group, m is an integer of from 1 to 5, n is 0 or 1, and Y is a precursor group capable of being converted into a carboxylic acid group by hydrolysis).

$X^1$ and $X^2$ in the monomer (1) are preferably a fluorine atom.

As specific examples of the monomer (1), for example, $CF_2=CF_2$, $CF_2=CFCl$ and $CF_2=CFCF_3$ may be mentioned, and $CF_2=CF_2$ is preferred.

Y in the monomer (2) is preferably —COOR$^1$ (wherein R$^1$ is a $C_{1-4}$ alkyl group), —CN or —COZ (wherein Z is a halogen atom), more preferably —COOR$^1$, particularly preferably —COOCH$_3$.

m is preferably 2 or 3.

As the monomer (2), the following compounds are preferred.

$CF_2=CFOCF_2CF(CF_3)OCF_2CF_2COOCH_3$,
$CF_2=CFOCF_2CF_2COOCH_3$,
$CF_2=CFOCF_2CF_2CF_2COOCH_3$,
$CF_2=CFOCF_2CF_2CF_2OCF_2CF_2COOCH_3$,
$CF_2=CFOCF_2CF_2CF_2CF_2CF_2COOCH_3$,
$CF_2=CFOCF_2CF(CF_3)OCF_2CF_2CF_2COOCH_3$.

The reinforcing material may, for example, be a woven fabric, a nonwoven fabric, fibrils or a porous material, and in view of the strength, it is preferably a woven fabric. As the material of the reinforcing material, a fluorinated polymer such as a polytetrafluoroethylene (hereinafter sometimes referred to as PTFE) may be mentioned.

The ion exchange capacity of the layer (α1)) 12 is preferably from 0.7 to 1.1 meq/g dry resin, more preferably from 0.8 to 1.1 meq/g dry resin.

The thickness of the layer (α1)) 12 is preferably from 5 to 50 μm, more preferably from 10 to 35 μm.

[Gas-Releasing Layer (α2)]

The gas-releasing layer (α2) 10 is a layer containing inorganic particles (hereinafter sometimes referred to as inorganic particles (P)) having an average secondary particle size of from 0.5 to 1.5 μm and a binder. By providing the gas-releasing layer (α2) 10, attachment of the gas to the surface on the cathode side of the fluorinated cation exchange membrane 1 is suppressed and as a result, an increase of the electrolysis voltage at the time of alkali metal chloride electrolysis is suppressed. Further, the gas-releasing layer (α2) 10 in the present invention is excellent in the resistance to dropping of the inorganic particles (P), and e.g. even when the gas-releasing layer (α2) 10 is rubbed with another member or the like, the inorganic particles hardly drop off, and a stable gas attachment suppressing effect will be obtained.

The inorganic particles (P) are preferably particles excellent in the corrosion resistance to e.g. an alkali metal chloride solution used for electrolysis and having hydrophilicity. Specifically, preferred are particles of at least one member selected from the group consisting of an oxide, nitride and carbide of a Group 4 element or Group 14 element, more preferably $SiO_2$, SiC, $ZrO_2$ or ZrC, particularly preferably $ZrO_2$.

The average primary particle size of the inorganic particles (P) is preferably from 0.01 to 1 μm, more preferably from 0.02 to 0.4 μm. When the average primary particle size of the inorganic particles (P) is at least the above lower limit, non-uniformity due to agglomeration tends to be small. When the average primary particle size of the inorganic particles (P) is at most the above upper limit, non-uniformity due to dispersion failure tends to be small.

The average secondary particles size of the inorganic particles (P) is from 0.5 to 1.5 μm, preferably from 0.7 to 1.3 μm. When the average secondary particle size of the inorganic particles (P) is at least the above lower limit, a high gas attachment suppressing effect will be obtained. When the average secondary particle size of the inorganic particles (P) is at most the above upper limit, excellent resistance to dropping of the inorganic particles (P) will be obtained.

The binder is preferably one excellent in the corrosion resistance to e.g. an alkali metal chloride used for electrolysis and having hydrophilicity, preferably a fluorinated polymer (C) having carboxylic acid group or sulfonic acid groups, more preferably a fluorinated polymer (C) having sulfonic acid groups. The fluorinated polymer (C) may be a homopolymer of a monomer having a carboxylic acid group or a sulfonic acid group, or may be a copolymer of a monomer having a carboxylic acid group or a sulfonic acid group and a monomer copolymerizable with the monomer.

The fluorinated polymer (C) having carboxylic acid groups may, for example, be a copolymer obtained by hydrolyzing Y in the copolymer mentioned for the layer (α1) and converting it into —COOH.

The fluorinated polymer (C) having sulfonic acid groups may, for example, be a polymer having sulfonic acid groups among polymers (B) mentioned for the after-mentioned layer (β1).

The mass ratio of the binder based on the total mass of the inorganic particles (P) and the binder (hereinafter referred to as the binder ratio) in the gas-releasing layer (α2) 10 is from 0.15 to 0.3, preferably from 0.15 to 0.25, more preferably from 0.16 to 0.20. When the binder ratio in the gas-releasing layer (α2) 10 is at least the above lower limit, excellent resistance to dropping of the inorganic particles (P) will be obtained. When the binder ratio in the gas-releasing layer (α2) 10 is at most the above upper limit, a high gas attachment suppressing effect will be obtained.

[Layer (β1)]

The layer (β1) 14 is a layer containing the polymer (B). The layer (β1) 14 preferably has a reinforcing material embedded, whereby the strength of the fluorinated cation exchange membrane 1 will be increased. In a case where the reinforcing material is embedded, by embedding it in the layer (β1) 14, not in the layer (α1) 12, a reinforcing effect will be obtained without impairing the electrolysis performance.

The layer (β1) 14 may be a monolayer or may be a multilayer. In a case where a reinforcing material is embedded in the layer (β1) 14, it is preferred that the layer (β1) 14 is a multilayer, and the reinforcing material is inserted between layers at the time of production so that the reinforcing material is embedded in the layer (β1) 14.

The polymer (B) is preferably a copolymer of structural units derived from the monomer (1) and structural units derived from the following monomer (3) or a copolymer obtained by hydrolyzing the copolymer to convert W into —SO$_3$H:

$$CF_2=CF(OCF_2CFX^4)_sO(CF_2)_tW \quad (3)$$

(in the formula (3), X$^4$ is a fluorine atom or a trifluoromethyl group, s is an integer of from 1 to 3, t is 0, 1 or 2, and W is a precursor group capable of being converted into a sulfonic acid group by hydrolysis).

W in the monomer (3) is preferably —SO$_2$X$^5$ (wherein X$^5$ is a fluorine atom, a chlorine atom or a bromine atom), —SO$_3$R$^2$ (wherein R$^2$ is a C$_{1-4}$ alkyl group), more preferably —SO$_2$X$^5$, particularly preferably —SO$_2$F.

As the monomer (3), the following compounds are preferred.

CF$_2$=CFOCF$_2$CF(CF$_3$)OCF$_2$CF$_2$CF$_2$SO$_2$F,
CF$_2$=CFOCF$_2$CF(CF$_3$)OCF$_2$CF$_2$SO$_2$F,
CF$_2$=CFOCF$_2$CF$_2$CF$_2$SO$_2$F,
CF$_2$=CFOCF$_2$CF$_2$SO$_2$F.

In a case where the layer (β1) is a multilayer, the polymers (B) forming the respective layers may be the same or different.

The reinforcing material to be embedded in the layer (β1) 14 may, for example, be the reinforcing material mentioned for the layer (α1)) 12, and in view of the strength, it is preferably a woven fabric.

The total thickness of the layer (β1) 14 is preferably from 55 to 200 μm, more preferably from 70 to 160 μm, in order that the layer (β1) 14 has sufficient strength.

In a case where a reinforcing material is embedded in the layer (β1) 14, the thickness of the portion on the anode side from the reinforcing material in the layer (β1) 14 is preferably from 10 to 60 μm. When this thickness is at least the above lower limit, the reinforcing material is readily embedded in the layer (β1), and interlayer separation tends to be suppressed. When the above thickness is at most the above upper limit, an increase of the membrane resistance tends to be suppressed.

In a case where the reinforcing material is embedded in the layer (β1) 14, the thickness on the cathode side from the reinforcing material in the layer (β1) 14 is preferably from 45 to 140 μm, more preferably from 60 to 100 μm.

The ion exchange capacity of the layer (β1) 14 is preferably from 0.9 to 1.15 meq/g dry resin, more preferably from 1.0 to 1.15 meq/g dry resin. With a view to preventing peeling of the layer (α1) 12 and the layer (β1) 14, the difference in the ion exchange capacity between the layer (α1) 12 and the layer (β1) 14 is preferably as small as possible, and is preferably, for example, at most 1.0 meq/g dry resin.

In a case where a reinforcing material is embedded in the layer (β1) 14, the ion exchange capacity on the anode side from the reinforcing material in the layer (β1) 14 is equal to or higher than the ion exchange capacity on the cathode side from the reinforcing material, and is preferably, for example, higher by at least 0.1 meq/g dry resin, whereby the electrolysis voltage tends to be reduced.

[Gas-Releasing Layer (β2)]

As the gas-releasing layer (β2) 16, a known gas-releasing layer provided on the anode side of a fluorinated cation exchange membrane used for alkali metal chloride electrolysis may be employed.

The gas-releasing layer (β2) 16 may, for example, be a layer containing inorganic particles and a binder. The inorganic particles may, for example, be the same particles as the inorganic particles (P) mentioned for the gas-releasing layer (α2). As the binder, a known binder employed for a gas-releasing layer on the anode side may be employed, and for example, methylcellulose may be mentioned.

<Method for Producing Fluorinated Cation Exchange Membrane>

Now, as an example of the method for producing a fluorinated cation exchange membrane of the present invention, a method for producing the fluorinated cation exchange membrane 1 will be described.

As a method for producing the fluorinated cation exchange membrane 1, for example, a method having the following steps (a) to (c) may be mentioned.

Figure 2:
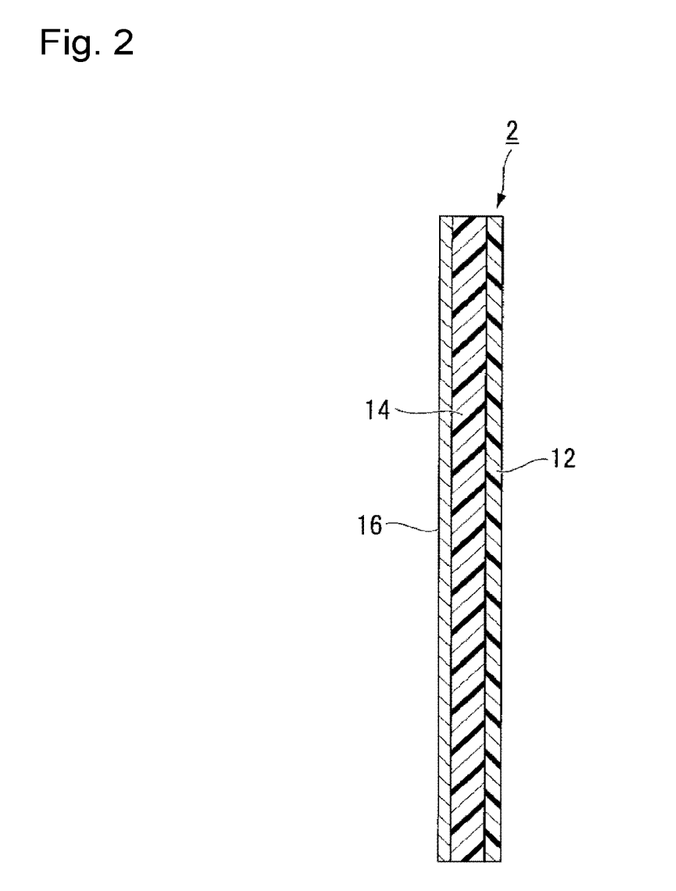
FIG. 2 is a cross-sectional view schematically illustrating a composite membrane produced in the procedure in an example of the method for producing a fluorinated cation exchange membrane of the present invention.

(a) A step [step (a)] of laminating the gas-releasing layer (β2) 16, the layer (β1) 14 and the layer (α1) 12 in this order to obtain a composite membrane 2 as shown in FIG. 2.

(b) A step [step (b)] of hydrolyzing and converting precursor groups of carboxylic acid groups and precursor groups of sulfonic acid groups in the composite membrane 2 into carboxylic acid groups and sulfonic acid groups, as the case requires.

(c) A step [step (c)] of applying a coating liquid (hereinafter sometimes referred to as a coating liquid (D)) containing the inorganic particles (P), the binder and a dispersion medium in a binder ratio of from 0.15 to 0.3, to the surface of the layer (α1) 12 in the composite membrane 2, and removing the dispersion medium by heating to form the gas-releasing layer (α2) 10 thereby to obtain the fluorinated cation exchange membrane 1.

[Step (a)]

The method for obtaining the composite membrane 2 is not particularly limited, and a known method may be employed.

In a case where both the layer (α1) 12 and the layer (β1) 14 are a monolayer, for example, the following method may be mentioned. By a coextrusion method using the polymer (A) and the polymer (B), a laminate film with a laminate structure of layer (α1) 12/layer (β1) 14 is obtained. A paste having inorganic particles dispersed in a dispersion medium (such as an aqueous methylcellulose solution) is applied to the surface of a subsidiary material (such as a polyethylene film or a polyethylene terephthalate film) and dried to obtain a gas-releasing layer-provided subsidiary material having a gas-releasing layer (β2) 16. The above laminate film and the gas-releasing layer-provided subsidiary material are overlaid so that the gas-releasing layer (β2) 16 faces the layer (β1) 14 and contact-bonded by heating to obtain a composite membrane 2.

The subsidiary material should be separated before the finally obtained fluorinated cation exchange membrane 1 is hydrolyzed. The gas-releasing layer (β2) 16 is preferably formed by using a subsidiary material as mentioned above, in view of easy formation. Further, the gas-releasing layer (β2) may be formed by the same method as the after-mentioned step (c).

The method of applying the paste is not particularly limited, and for example, a gravure roll method may be mentioned.

The method of contact-bonding the films by heating is not particularly limited, and for example, a method of using laminating rollers having a pair of a metal roller and a rubber-lined roller may be mentioned.

In a case where the layer (α1) 12 is a multilayer, for example, the following method may be mentioned. A laminate film is obtained by a coextrusion method using the polymer (A) and the polymer (B), a monolayer film obtained by an extrusion method using the polymer (A) is overlaid on the polymer (A) layer side of the above obtained laminate film, and a monolayer film of the gas-releasing layer (β2) 16 obtained in the same manner as above is overlaid on the polymer (B) layer side, and the films are contact-bonded by heating to obtain a composite membrane 2.

The number of lamination of the monolayer film of the polymer (A) is properly determined in accordance with the layer structure of the layer ($\alpha$1) 12. Further, in a case where the reinforcing material is embedded in the layer ($\alpha$1) 12, when the respective films are overlaid, the reinforcing material is inserted between films forming the layer ($\alpha$1) 12, followed by contact bonding by heating, whereby the reinforcing material is embedded.

The contact-bonding of the films by heating may be carried out dividedly in a multistage manner.

In a case where the layer ($\beta$1) 14 is a multilayer, for example, the following method may be mentioned. A laminate film is obtained by a coextrusion method using the polymer (A) and the polymer (B), and on the polymer (B) layer side of the laminate film, a monolayer film obtained by an extrusion method using the polymer (B) and a monolayer film of the gas-releasing layer ($\beta$2) 16 obtained in the same manner as above are overlaid in this order, and the films are contact-bonded by heating to obtain the composite membrane 2.

The number of lamination of the monolayer film of the polymer (B) is properly determined in accordance with the layer structure of the layer ($\beta$1) 14. Further, in a case where the reinforcing material is embedded in the layer ($\beta$1) 14, when the respective films are overlaid, the reinforcing material is inserted between films forming the layer ($\beta$1) 14, followed by contact bonding by heating, whereby the reinforcing material is embedded.

Further, contact-bonding of the respective films by heating may be carried out dividedly in a multistage manner.

[Step (b)]

In a case where the composite membrane 2 has at least one of precursor groups of carboxylic acid groups and precursor groups of sulfonic acid groups, the precursor groups are hydrolyzed and converted into carboxylic acid groups or sulfonic acid groups.

As a method for hydrolyzing the precursor groups, a known method may be employed, and for example, the method disclosed in JP-A-01-140987 may be mentioned. Particularly preferred is a method of using a mixture of a water-soluble organic compound (such as dimethylsulfoxide) and a hydroxide of an alkali metal (such as potassium hydroxide).

It is preferred to carry out the step (b) before the step (c), in that the coating liquid (D) is favorably attached to the layer ($\alpha$1)) in the step (c), and a gas-releasing layer ($\alpha$2) excellent in the resistance to dropping of the inorganic particles (P) tends to be formed. On the other hand, it is preferred to carry out the step (b) after the step (c) in that the precursor groups of carboxylic acid groups are less likely to be impaired by the dispersion medium of the coating liquid (D) than the carboxylic acid groups, and properties of the layer ($\alpha$1)) tend to be obtained, and the procedure is easily conducted.

[Step (c)]

To the surface of the layer ($\alpha$1) 12 in the composite membrane 2, a coating liquid (D) containing inorganic particles (P), a binder and a dispersion medium with a binder ratio of from 0.15 to 0.3 is applied. Then, the dispersion medium is removed e.g. by heating to form the gas-releasing layer ($\alpha$2).

As a method for preparing the coating liquid (D), preferred is a method of mixing the inorganic particles (P), the binder and the dispersion medium, followed by stirring e.g. by a ball mill to homogenize them, followed by a dispersion treatment by a bead mill. By such a method, it is easy to control the average secondary particle size of the inorganic particles (P) to be within a range of from 0.5 to 1.5 µm.

The average secondary particle size of the inorganic particles (P) in the coating liquid (D) may be controlled by adjusting the average primary particle size of the inorganic particles (P), the treatment time for the dispersion treatment, etc.

The dispersion medium is, in a case where the binder is a fluorinated polymer (C) having sulfonic acid groups, preferably an alcohol solvent (such as ethanol or isopropyl alcohol). Such an alcohol solvent is preferably one having a boiling point of from 60 to 100° C., more preferably from 70 to 90° C., in order that the solvent is removed by heating in the subsequent step.

Further, the dispersion medium may be an aprotic polar solvent such as dimethylsulfoxide (hereinafter referred to as DMSO), formamide, N,N-dimethylacetamide or N,N-dimethylformamide. The aprotic polar solvent is preferably one having a boiling point of at least 140° C. and a melting point of at most 25° C., more preferably a boiling point of at most the melting point of the polymer (A). Specifically, preferred is one having a boiling point of from 100 to 220° C., more preferably from 150 to 210° C.

In a case where the aprotic polar solvent is used, a coating liquid (D) having the aprotic polar solvent incorporated may be prepared and applied, or a coating liquid (D) using a dispersion medium (such as an alcohol solvent) other than the aprotic polar solvent may be prepared and applied, and then the aprotic polar solvent is applied.

The content of the dispersion medium in the coating liquid (D) (100 mass %) is preferably from 30 to 95 mass %, more preferably from 70 to 90 mass %. When the content of the dispersion medium is within the above range, such a coating liquid (D) is suitable for application by a spray method, since the binder is well dispersed and the coating liquid (D) has an appropriate viscosity.

In a case where the aprotic polar solvent is used, the content of the aprotic polar solvent in the coating liquid (D) (100 mass %) is preferably from 1 to 70 mass %, more preferably from 10 to 50 mass %.

As a method for applying the coating liquid (D), a known application method may be employed, and for example, a spray method or a roll coater method may be mentioned, and a spray method is preferred. In a case where the composite membrane 2 has precursor groups of carboxylic acid groups and the step (c) is carried out before the step (b), a spray method is preferred, whereby the adhesion of the coating liquid (D) will be more favorable, and it is particularly preferred to employ a spray method with a small amount of the air.

The heating method is not particularly limited, and a method of using a heated roller, or a method of using an oven may, for example, be mentioned. Particularly, industrially preferred is a method of continuously conducting heat treatment by a roll pressing machine provided with heated rollers.

In the case of using a roll pressing machine, the pressure to be applied is preferably a linear pressure of at most 0.2 MPa in view of power saving.

The heating temperature is preferably at least 30° C., more preferably at least the boiling point of the dispersion medium to be used. In general, if the heating temperature is lower than the boiling point of the dispersion medium, the dispersion medium tends to remain on the surface of the membrane, however, depending upon the type of the dispersion medium, the dispersion medium may be sufficiently volatilized even by heating at a temperature of the boiling point or lower in relation to the vapor pressure.

Further, the heating temperature is preferably less than the boiling point of the polymer (A) and the polymer (B), and specifically preferably at least 80° C., more preferably at least 100° C., whereby non-uniformity of the membrane thickness tends to be suppressed.

In the above-described method for producing a fluorinated cation exchange membrane of the present invention, since the gas-releasing layer ($\alpha 2$) is formed on the surface of the layer ($\alpha 1$) on the cathode side by the coating liquid (D), it is possible to satisfy both high effect to suppress attachment of gas to the membrane surface on the cathode side and excellent resistance to dropping of the inorganic particles (P) from the gas-releasing layer ($\alpha 2$).

The method for producing a fluorinated cation exchange membrane of the present invention is not limited to the above method. For example, it may be a method of carrying out the step (b) after the step (c), or in a case where a polymer (A) having carboxylic acid groups and having no precursor groups of carboxylic acid groups and a polymer (B) having sulfonic acid groups and having no precursor groups of sulfonic acid groups are used, a method without step (b) may be employed.

Further, a method may be employed in which the gas-releasing layer ($\alpha 2$) is formed on the surface of the layer ($\alpha 1$)) of the laminate film of the layer ($\alpha 1$)) and the layer ($\beta 1$) by the coating liquid (D) and then the gas-releasing layer ($\beta 2$) is laminated.

Further, a method may be employed in which the gas-releasing layer ($\beta 2$) is formed by applying the coating liquid (D) in the same manner as the gas-releasing layer ($\alpha 2$).

Further, the method for producing a fluorinated cation exchange membrane of the present invention may be a method for producing a fluorinated cation exchange membrane having no gas-releasing layer ($\beta 2$).

EXAMPLES

Now, the present invention will be described in further detail with reference to Examples, however, the present invention is by no means limited to the following specific Examples.

[Average Primary Particle Size]

Inorganic particles (e.g. zirconium oxide) were observed by a scanning electron microscope (SEM), and the particle sizes of 30 minimum particles in the SEM observation image were measured by an image dimension measurement software (Pixs2000 PRO manufactured by INNOTECH CORPORATION), and their average value was taken as the average primary particle size.

[Average Secondary Particle Size]

Inorganic particles (e.g. zirconium oxide) were dispersed in ethanol so that the concentration would be at most 0.01 mass %, and by measurement by Microtrac (UPA-150 manufactured by NIKKISO CO., LTD.), the particle size (D50) at a point of an accumulative volume of 50% in an accumulative volume distribution curve drawn by taking the whole volume of the obtained particle size distribution to be 100%, was taken as the average secondary particle size.

Preparation Example 1

Preparation of Perfluorocarbon Polymer (A1)

$CF_2=CF_2$ and $CF_2=CFOCF_2CF_2CF_2COOCH_3$ were copolymerized to obtain a perfluorocarbon polymer (A1) (hereinafter referred to as a polymer (A1)) having an ion exchange capacity of 1.00 meq/g dry resin when hydrolyzed.

Preparation Example 2

Preparation of Perfluorocarbon Polymer (B1)

$CF_2=CF_2$ and $CF_2=CFOCF_2CF(CF_3)OCF_2CF_2SO_2F$ were copolymerized to obtain a perfluorocarbon polymer (B1) (hereinafter referred to as a polymer (B1)) having an ion exchange capacity of 1.0 meq/g dry resin when hydrolyzed.

Preparation Example 3

Preparation of Perfluorocarbon Polymer (B2)

$CF_2=CF_2$ and $CF_2=CFOCF_2CF(CF_3)OCF_2CF_2SO_2F$ were copolymerized to obtain a perfluorocarbon polymer (B2) (hereinafter referred to as a polymer (B2)) having an ion exchange capacity of 1.1 meq/g dry resin when hydrolyzed.

Preparation Example 4

Preparation of Perfluorocarbon Polymer (C1)

The polymer B2 was dipped in a solution of DMSO/potassium hydroxide/water=15/23/62 (mass ratio) at 95° C. for 30 minutes to hydrolyze and convert precursor groups ($-SO_2F$ groups) of sulfonic acid groups in the polymer B2 into $-SO_3K$ groups. Then, the obtained polymer was dipped in a 2 mol/L (liter) aqueous hydrochloric acid solution at 60° C. for 1 hour. The aqueous hydrochloric acid solution was changed, and the same treatment was repeated further for 10 times to obtain a perfluorocarbon polymer (C1) (hereinafter referred to as a polymer (C1)) having $-SO_3K$ groups converted into sulfonic acid groups ($-SO_3H$ group). The polymer (C) was sufficiently washed with ultrapure water.

Preparation Example 5

Preparation of Coating Liquid (D1)

The polymer (C1) was dissolved in ethanol to prepare a 9.5 mass % ethanol solution. To the ethanol solution, 10.8 mass % of zirconium oxide having an average primary particle size of 0.4 μm as inorganic particles was added to adjust the binder ratio to be 0.25, and the mixture was uniformly stirred by a ball mill, and the balls were removed by sieving. Then, a dispersion treatment was further carried out by a bead mill (UAM-015 manufactured by KOTOBUKI INDUSTRIES, CO., LTD.), and the beads were removed by centrifugal separation to obtain a coating liquid (D1) (suspension) in which the average secondary particle size of zirconium oxide was 1.3 μm.

Preparation Examples 6 to 12, 14 and 15

Preparation of Coating Liquids (D2) to (D8), (D10) and (D11)

Coating liquids (D2) to (D8), (D10) and (D11) (suspensions) were obtained in the same manner as in Preparation Example 5 except that the average primary particle size of zirconium oxide and the binder ratio were changed as identified in Table 1, and the dispersion treatment was carried out so that the average secondary particle size of zirconium oxide would be as identified in Table 1. The binder ratio was controlled by adjusting the concentration of the polymer (C1) in the ethanol solution.

Preparation Example 13

A coating liquid (D9) (suspension) in which the average secondary particle size of zirconium oxide was 3 μm was obtained in the same manner as in Preparation Example 5 except that zirconium oxide having an average primary particle size of 0.02 μm was used, the binder ratio was changed to OA, and the dispersion treatment was not carried out after the mixture was uniformly stirred by a ball mill.

The average primary particle size and the average secondary particle size of zirconium oxide and the binder ratio in each of the coating liquids (D1) to (D11) are shown in Table 1.

TABLE 1

| | | Preparation Example | | | | | | | | | | |
|---|---|---|---|---|---|---|---|---|---|---|---|---|
| | | 5 | 6 | 7 | 8 | 9 | 10 | 11 | 12 | 13 | 14 | 15 |
| Coating liquid | | D1 | D2 | D3 | D4 | D5 | D6 | D7 | D8 | D9 | D10 | D11 |
| Zirconium oxide | Average primary particle size [μm] | 0.4 | 0.4 | 0.4 | 0.4 | 0.4 | 0.02 | 0.4 | 0.4 | 0.02 | 0.02 | 0.02 |
| | Average secondary particle size [μm] | 1.3 | 1.3 | 1.3 | 0.7 | 0.8 | 1.3 | 1.3 | 1.3 | 3 | 0.3 | 1.3 |
| Binder ratio (mass ratio) | | 0.25 | 0.2 | 0.165 | 0.2 | 0.2 | 0.2 | 0.4 | 0.1 | 0.4 | 0.2 | 0.4 |

Ex. 1

Using an apparatus equipped with two extruders, a film die for coextrusion and a take-off machine, a film-1 having a layer (α1-1) having a thickness of 13 μm made of the polymer (A1) and a layer (β1-1) having a thickness of 25 μm made of the polymer (B1) laminated was obtained. Further, using a film die for monolayer extrusion, a film-2 (layer (β1-2)) having a thickness of 30 μm made of the polymer (B2) and a film-3 (layer (β1-3)) having a thickness of 45 μm made of the polymer (B2) were obtained. Further, a paste having zirconium oxide dispersed in a 1 mass % aqueous methylcellulose solution was applied on a subsidiary material consisting of a polyethylene terephthalate film (hereinafter sometimes referred to as PET) by a gravure roll method so that the dry mass would be 20 g/m² and dried to obtain a film-4 provided with a coating film (gas-releasing layer (β2-1)) containing zirconium oxide.

Further, as a reinforcing material, a woven fabric-5 was obtained by plain weaving using a 100 denier thread made of PTFE and a 30 denier thread consisting of 6 filaments made of PET, with a density of the PTFE thread of 27 threads/1 inch and a density of the PET thread of 53 threads/1 inch.

Then, using laminating rollers having a pair of a metal roller and a rubber-lined roller, the film-4, the film-2, the woven fabric-5, the film-3 and the film-1 were laminated in this order and integrated at a temperature of 200° C. under a linear pressure of 40 kg/cm at a rate of 0.4 m/min to obtain a composite membrane. At the time of lamination, the film-4 was disposed so that the coating film side faced the film-2 side, the film-1 was disposed so that the layer (β1-1) faced the film-3 side, and the lamination structure of the composite membrane was such that the subsidiary material/the gas-releasing layer (β2-1)/the layer (β1-2)/the woven fabric/the layer (β1-3)/the layer (β1-1)/the layer (α1-1).

The obtained composite membrane was dipped in a solution of DMSO/potassium hydroxide/water=15/23/62 (mass ratio) at 95° C. for 30 minutes to hydrolyze and convert precursor groups of carboxylic acid and precursor groups of sulfonic acid respectively into potassium carboxylate and potassium sulfonate. Further, the composite membrane was dipped in a 10 mass % aqueous sodium hydroxide solution and washed with water for conversion into a sodium salt form, and the film was dried.

On the surface of the layer (α1-1) of the dried composite membrane, the coating liquid (D1) was applied by a spray method to form a gas-releasing layer (α2-1) on the surface of the layer (α1-1). Then, using laminating rollers having a pair of a metal roller and a rubber-lined roller, the composite membrane having the coating liquid (D1) applied was heated at a temperature of 135° C. under a linear pressure of 1.5 kg/cm at a rate of 0.04 m/m in and further dipped in deionized water at a temperature of 40° C. to conduct dimension-stabilization treatment thereby to obtain a fluorinated cation exchange membrane having the layer (α1-1) and the gas-releasing layer (α2-1) on the cathode side.

Ex. 2 to 6

In the same manner as in Ex. 1 except that the coating liquid was changed as identified in Table 2, a fluorinated cation exchange membrane having any of gas-releasing layers (α2-2) to (α2-6) instead of the gas-releasing layer (α2-1) was obtained.

Ex. 7 to 11

In the same manner as in Ex. 1 except that the coating liquid was changed as identified in Table 2, a fluorinated cation exchange membrane having any of gas-releasing layers (γ-1) to (γ-5) instead of the gas-releasing layer (α2-1) was obtained.

[Evaluation Method]
(Rubbing Test)

As a rubbing tester, abrasion resistance testing machine IMC-1558-1 model manufactured by Imoto Machinery Co., Ltd. was used, and as an abrader, a urethane foam sheet (density: 22 kg/m³) manufactured by INOAC CORPORATION was used. A rubbing test was carried out in such a manner that the abrader was brought into contact with the surface of the gas-releasing layer on the cathode side of the fluorinated cation exchange membrane obtained in each Ex., and the abrader was moved for 20 back and forth motions under a load of 20 g. The amount of the inorganic particles (zirconium oxide) on the surface of the gas-releasing layer on the cathode side of the fluorinated cation exchange membrane was measured by a fluorescent X-ray measuring apparatus before and after the rubbing test, and the residual ratio of the amount of the inorganic particles (zirconium oxide) after the rubbing test relative to the amount of the inorganic particles (zirconium oxide) before the rubbing test was calculated.

(Electrolysis Test (Gas Attachment Test))

The fluorinated cation exchange membrane was disposed in an electrolytic cell so that the gas-releasing layer on the layer ($\alpha$1-1) side faced the cathode and the gas releasing layer ($\beta$2-1) side faced the anode, and electrolysis of an aqueous sodium chloride solution was carried out. An electrolytic cell having an effective current-carrying area of 1.5 $dm^2$ was used as the electrolytic cell, DSE manufactured by De Nora Permelec Ltd. was used as the cathode, and a Raney nickel-plated cathode manufactured by ThyssenKrupp Uhde Chlorine Engineers (Japan) Ltd. was used as the cathode. Electrolysis was conducted at a current density of 6 $kA/m^2$ at a temperature of 90° C. while an aqueous sodium chloride solution was supplied to an anode compartment with its concentration adjusted to 200 g/L and the concentration of sodium hydroxide discharged from a cathode compartment was kept at 32 mass %. The voltage (CV-1) one day after initiation of electrolysis was measured, then 100 mL of a polymer solution having the polymer (C1) dissolved at 0.05 mass % in a mixture of water/ethanol=95/5 (mass ratio) was added over a period of 1 hour to the water supplied to the cathode, and the voltage (CV-2) was measured again, and a difference ($\Delta$CV) between CV-1 and CV-2 was calculated. The larger the amount of the gas attached to the gas-releasing layer, the larger $\Delta$CV.

The composition of the coating liquid used for formation of the gas-releasing layer on the cathode side of the fluorinated cation exchange membrane, the results of the electrolysis test, and the results of the rubbing test are shown in Table 2.

Whereas with the fluorinated cation exchange membrane in each of Ex. 7 and 11 in which the coating liquid (D7) or (D11) with a binder ratio exceeding 0.3 was used for forming the gas-releasing layer on the cathode side and with the fluorinated cation exchange membrane in Ex. 10 in which the coating liquid (D10) in which the average secondary particle size of zirconium oxide was less than 0.5 μm was used, $\Delta$CV in the electrolysis test was large, and attachment of the gas to the gas-releasing layer was not sufficiently suppressed.

With the fluorinated cation exchange membrane in Ex. 8 in which the coating liquid (D8) with a binder ratio of less than 0.15 was used for forming the gas-releasing layer on the cathode side and with the fluorinated cation exchange membrane in Ex. 9 in which the coating liquid (D9) in which the average secondary particle size of zirconium oxide exceeded 1.5 μm was used, the zirconium oxide residual ratio in the rubbing test was low, and the resistance to dropping of zirconium oxide was poor.

INDUSTRIAL APPLICABILITY

A fluorinated cation exchange membrane produced by the production method of the present invention is applicable to a wide range of fields as a cation exchange membrane for electrolysis of e.g. an alkali metal chloride.

This application is a continuation of PCT Application No. PCT/JP2014/083776 filed on Dec. 19, 2014, which is based upon and claims the benefit of priority from Japanese Patent Application No. 2013-267208 filed on Dec. 25, 2013. The contents of those applications are incorporated herein by reference in their entireties.

REFERENCE SYMBOLS

1: fluorinated cation exchange membrane
2: composite membrane
10: gas-releasing layer ($\alpha$2)
12: layer ($\alpha$1)
14: layer ($\beta$1)
16: gas-releasing layer ($\beta$2)

TABLE 2

| | | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|---|
| Gas-releasing layer (cathode side) | Type | $\alpha$2-1 | $\alpha$2-2 | $\alpha$2-3 | $\alpha$2-4 | $\alpha$2-5 | $\alpha$2-6 | $\gamma$-1 | $\gamma$-2 | $\gamma$-3 | $\gamma$-4 | $\gamma$-5 |
| | Coating liquid used | D1 | D2 | D3 | D4 | D5 | D6 | D7 | D8 | D9 | D10 | D11 |
| | Zirconium oxide Average primary particle size [μm] | 0.4 | 0.4 | 0.4 | 0.4 | 0.4 | 0.02 | 0.4 | 0.4 | 0.02 | 0.02 | 0.02 |
| | Average secondary particle size [μm] | 1.3 | 1.3 | 1.3 | 0.7 | 0.8 | 1.3 | 1.3 | 1.3 | 3 | 0.3 | 1.3 |
| | Binder ratio | 0.25 | 0.2 | 0.165 | 0.2 | 0.2 | 0.2 | 0.4 | 0.1 | 0.4 | 0.2 | 0.4 |
| Electrolysis test (gas attachment test) | CV-1 [V] | 3.12 | 3.17 | 3.12 | 3.17 | 3.17 | 3.12 | 3.26 | 3.12 | 3.12 | 3.22 | 3.18 |
| | CV-2 [V] | 3.12 | 3.17 | 3.12 | 3.17 | 3.17 | 3.12 | 3.12 | 3.12 | 3.12 | 3.12 | 3.12 |
| | $\Delta$CV [mV] | 0 | 0 | 0 | 0 | 0 | 0 | 140 | 0 | 0 | 100 | 60 |
| Rubbing test Zirconium oxide residual ratio [%] | | 70 | 65 | 60 | 83 | 65 | 65 | 92 | 20 | 30 | 79 | 80 |

As shown in Table 2, with the fluorinated cation exchange membrane in each of Ex. 1 to 6 obtained by the production method of the present invention, $\Delta$CV in the electrolysis test was 0 mV, the effect to suppress attachment of the gas to the gas-releasing layer was high, the zirconium oxide residual ratio in the rubbing test was high, and the resistance to dropping of zirconium oxide was excellent.

What is claimed is:

1. A method for producing a fluorinated cation exchange membrane for electrolysis comprising a layer ($\alpha$1) containing a perfluorocarbon polymer (A) having a carboxylic acid group or a precursor group of a carboxylic acid group, and a gas-releasing layer ($\alpha$2) provided on a cathode-facing side of the layer ($\alpha$1), the method comprising:

applying to the cathode-facing side of the layer (α1) a coating liquid consisting of inorganic particles, a binder and a dispersion medium to form the gas-releasing layer (α2), wherein a mass ratio of the binder to a total mass of the inorganic particles and the binder in the coating liquid is from 0.16 to 0.25, the inorganic particles have an average primary particle size of from 0.02 to 0.4 μm and an average secondary particle size of from 0.5 to 1.5 μm, the binder is a fluorinated polymer (C) having sulfonic acid groups, and the dispersion medium is an alcohol and is free of an aprotic polar solvent.

2. The method according to claim 1, wherein the inorganic particles are particles of at least one member selected from the group consisting of an oxide, nitride and carbide of a Group 4 element or Group 14 element.

3. The method according to claim 1, wherein the inorganic particles are particles of $SiO_2$, SiC, $ZrO_2$ or ZrC.

4. The method according to claim 1, wherein the inorganic particles have the average primary particle size of 0.4 μm.

5. The method according to claim 4, wherein the inorganic particles are particles of $ZrO_2$.

6. The method according to claim 1, wherein the perfluorocarbon polymer (A) is a copolymer having structural units derived from the monomer (1) and structural units derived from the monomer (2):

$$CF_2=CX^1X^2 \qquad (1)$$

$$CF_2=CF(OCF_2CFX^3)_nO(CF_2)_mY \qquad (2)$$

wherein, in the formula (1), each of $X^1$ and $X^2$ which are independent of each other, is a fluorine atom, a chlorine atom or a trifluoromethyl group, and in the formula (2), $X^3$ is a fluorine atom or a trifluoromethyl group, m is an integer of from 1 to 5, n is 0 or 1, and Y is a precursor group capable of being converted into a carboxylic acid group by hydrolysis.

7. The method according to claim 1, wherein the layer (α1) has an ion exchange capacity of from 0.7 to 1.1 meq/g dry resin.

8. The method according to claim 1, wherein the inorganic particles are particles of $ZrO_2$.

9. The method according to claim 1,
wherein the inorganic particles are particles of $SiO_2$, SiC, $ZrO_2$ or ZrC, and
the inorganic particles have the average secondary particle size of from 0.7 to 1.3 μm.

10. The method according to claim 1,
wherein the inorganic particles are particles of $ZrO_2$, and
the inorganic particles have the average secondary particle size of from 0.7 to 1.3 μm.

11. The method according to claim 1, wherein the dispersion medium consists of an alcohol.

12. The method according to claim 1, wherein the alcohol comprises ethanol, isopropyl alcohol, or both.

13. The method according to claim 1, wherein the gas-releasing layer (α2) is formed by a method consisting of the applying of the coating liquid to the cathode-facing side of the layer (α1) and then removing the dispersion medium in the coating liquid.

14. The method according to claim 1, wherein the fluorinated cation exchange membrane further comprises a layer (β1) containing a perfluorocarbon polymer (B) having a sulfonic acid group or a precursor group of a sulfonic acid group on an anode-facing side of the layer (α1).

15. The method according to claim 14, wherein the fluorinated cation exchange membrane further comprises a gas-releasing layer (β2) provided on an anode-facing side of the layer (β1).

16. The method according to claim 14, wherein the perfluorocarbon polymer (B) is a copolymer having structural units derived from the monomer (1) and structural units derived from the monomer (3):

$$CF_2=CX^1X^2 \qquad (1)$$

$$CF_2=CF(OCF_2CFX^4)_sO(CF_2)_tW \qquad (3)$$

wherein, in the formula (1), each of $X^1$ and $X^2$ which are independent of each other, is a fluorine atom, a chlorine atom or a trifluoromethyl group, and in the formula (3), $X^4$ is a fluorine atom or a trifluoromethyl group, s is an integer of from 1 to 3, t is 0, 1 or 2, and W is a precursor group capable of being converted into a sulfonic acid group by hydrolysis.

17. The method according to claim 14, wherein the layer (β1) has an ion exchange capacity of from 0.9 to 1.15 meq/g dry resin.

18. The method according to claim 15, comprising:
laminating the gas-releasing layer (β2), the layer (β1) and the layer (α1) in this order to obtain a composite membrane;
when the composite membrane has precursor groups of carboxylic acid groups and/or precursor groups of sulfonic acid groups, hydrolyzing and converting the precursor groups of carboxylic acid groups and/or the precursor groups of sulfonic acid groups into carboxylic acid groups and/or sulfonic acid groups; and
after the coating liquid is applied to the cathode-facing side of the layer (α1), removing the dispersion medium by heating to form the gas-releasing layer (α2).

19. A method for producing a fluorinated cation exchange membrane for electrolysis comprising a layer (α1) containing a perfluorocarbon polymer (A) having a carboxylic acid group or a precursor group of a carboxylic acid group, and a gas-releasing layer (α2) provided on a cathode-facing side of the layer (α1), the method comprising:
applying to the cathode-facing side of the layer (α1) a coating liquid consisting of inorganic particles, a binder and a dispersion medium to form the gas-releasing layer (α2),
wherein a mass ratio of the binder to a total mass of the inorganic particles and the binder in the coating liquid is from 0.15 to 0.3,
the inorganic particles have an average primary particle size of from 0.02 to 0.4 μm and an average secondary particle size of from 0.5 to 1.5 μm,
the binder is a fluorinated polymer (C) having sulfonic acid groups, and
the dispersion medium is an alcohol and is free of an aprotic polar solvent.

* * * * *